US009014279B2

(12) United States Patent
Steinberg et al.

(10) Patent No.: US 9,014,279 B2
(45) Date of Patent: Apr. 21, 2015

(54) METHOD, SYSTEM AND APPARATUS FOR ENHANCED VIDEO TRANSCODING

(76) Inventors: Avigdor Steinberg, Sunnyvale, CA (US); Michael Shinsky, Menlo Park, CA (US); Maxim Levkov, Los Angeles, CA (US); Roderick Snell, Petersfield (GB)

( * ) Notice: Subject to any disclaimer, the term of this patent is extended or adjusted under 35 U.S.C. 154(b) by 680 days.

(21) Appl. No.: 13/316,472

(22) Filed: Dec. 10, 2011

(65) Prior Publication Data

US 2013/0148741 A1 Jun. 13, 2013

(51) Int. Cl.
*H04N 7/26* (2006.01)
*H04N 19/59* (2014.01)
*H04N 19/40* (2014.01)
*H04N 19/172* (2014.01)
*H04N 19/154* (2014.01)

(52) U.S. Cl.
CPC .............. *H04N 19/59* (2014.11); *H04N 19/172* (2014.11); *H04N 19/154* (2014.11); *H04N 19/40* (2014.11)

(58) Field of Classification Search
CPC ..................................................... H04N 19/003
USPC .......................................... 375/240.8, 240.27
See application file for complete search history.

(56) References Cited

U.S. PATENT DOCUMENTS

| 6,246,435 | B1* | 6/2001 | Patel ............................. 348/192 |
| 7,733,372 | B2 | 6/2010 | Ong et al. |
| 2003/0112996 | A1* | 6/2003 | Holliman et al. ............. 382/100 |
| 2006/0242669 | A1* | 10/2006 | Wogsberg ....................... 725/74 |
| 2007/0162487 | A1* | 7/2007 | Frailey .......................... 707/102 |
| 2008/0027709 | A1* | 1/2008 | Baumgarte ................. 704/200.1 |
| 2008/0304044 | A1* | 12/2008 | Cooper et al. ............... 356/5.15 |
| 2010/0106489 | A1* | 4/2010 | Bereends et al. ............. 704/207 |

* cited by examiner

*Primary Examiner* — Christopher S Kelley
*Assistant Examiner* — Jonathan Messmore
(74) *Attorney, Agent, or Firm* — Tran & Associates

(57) ABSTRACT

A system to perform automated conversion of video data includes a transcoder with a decoder processing video data for automatic video format detection and conversion of video data into uncompressed format; and an image scaler coupled to the setting controller to perform automatic video image size conversion based on horizontal and/or vertical scaling factors. The system also includes a video data pre-processor for compression of video data; a compression encoder to convert video data into compressed format; and a degradations and distortions meter (video quality analyzer) to process video data and data generated by said transcoder.

17 Claims, 6 Drawing Sheets

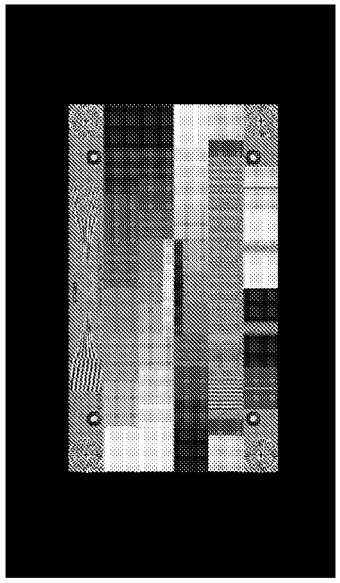

Fig. 5 (a)

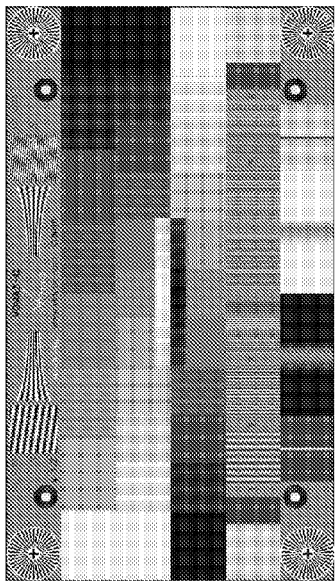

Fig. 5 (b)

| Parameter | Metadata value or assumed correct value | Measured value | Partial Quality Impairment Weighting Function | Type | Kqi dBqi |
|---|---|---|---|---|---|
| Frame Size, H x V | 1280 x 720 | 1280x720 | 0, 100 if abs(H-H0)+abs(V-Vo) > 0 | 3 | 0 |
| H & V zoom, Zh x Zv | 1.0 x 1.0 | 0.75 x 0.75 | 6*(abs(Zh-1)+abs(Zv-1)) + 12*abs(Zh-Zv) | 1 | 3 |
| Frequency Response, dB @ 400 tvl | 0 | -3 | 0.25*(V/Ftvl)*abs(FRdb) | 2 | 1.35 |
| Alias Response, dB @ 600 tvl | -40 | -10 | 20*(V/(Ftvl*(abs(ARdb)+1))) − 0.6 | 2 | 1.56 |
| UV gain − Y gain, dB | 0 | -1.6 | 0.5*abs(UVgain) | 2 | 0.8 |
| | | | Degradations Score, dBqi | | 3 |
| | | | Distortions Score, dBqi | | 3.71 |
| | | | Total Quality Impairment Score, dBqi | | 6.71 |

Type: 1 – Degradation, 2 – Distortion, 3 – Catastrophic Error (operation aborted, if >0)

Fig. 5 (c)

| Item | Description | Optional |
|---|---|---|
| General QC Report Info | Date, Location, Organization, Equipment, QC Report Originator, QC Report URL, etc | |
| General Content Info | *Standard tagged list* Title, Copyright, Type, Author, Originator, URL, ADID, UMID, etc | |
| Input Media Information | List of streams, followed by streams technical metadata: duration(s), format(s), codec(s), frame size, color space, aspect ratio(s), interlace ratio, frame rate, maximum bit rate, average bit rate, etc | |
| Input Quality of Service | Front-end Packets Drop Rate, Frame Drop Rate, Frame Freeze Rate, Maximum Freeze Duration, etc | X |
| Output Media Information | List of streams, followed by streams technical metadata: duration(s), format(s), codec(s), frame size, color space, aspect ratio(s), interlace ratio, frame rate, maximum bit rate, average bit rate, etc | |
| Output Quality of Service | Back-end Communication Channel Messages Log, etc | X |
| Transcoder Global Settings | Scaler settings (zoom, crop, aperture coefficients), pre-processor settings, buffer controls, minimum and maximum quantizer scales (Q values: IQ, PQ, BQ), etc | |
| Transcoder Timed Settings | Differential settings of M time segments (if applicable): - Segment #1, time interval from .. to .. ............ - Segment #M, time interval from .. to .. | X |
| Transcoder QC Report Summary | - Input Content Quality Impairment, dBqi, - Throughput Content Quality Impairment, dBqi, - Input & Throughput Content Quality Impairment, dBqi | |
| Transcoder Detailed QC Report | - Scaler Content Quality Impairment, dBqi, - Preprocessor Content Quality Impairment, dBqi, - Encoder Content Quality Impairment, dBqi, | X |
| Transcoder Test Report | Test Streams List: - Incoming Test Streams detected - Outgoing Test Streams, inserted and/or copied from input Test Pattern(s) Impairments, input and/or throughput: Geometry (zoom & pan), video levels (colors), Frequency Response, Stress Test Response | |
| Prior QC Reports Prior Reports Summary | N = N1 + N2: total number of appended prior QC Reports N1: number of Embedded QC Reports copied from input stream N2: number of QC Reports imported from other designated sources | X |
| Prior QC Report # N | | X |
| ............ | | |
| Prior QC Report # 1 | | X |

Fig. 6

METHOD, SYSTEM AND APPARATUS FOR ENHANCED VIDEO TRANSCODING

BACKGROUND

The present invention relates to a video content processing system.

Many applications require quality evaluation of video images. Such evaluations can be subjective or objective. Subjective quality evaluation techniques for video images are fully specified in the ITU-T Recommendation BT.500. The Recommendation provides a methodology for numerical indication of the perceived quality from the users' perspective of received media after compression and/or transmission. The score is typically expressed as a single number in the range 1 to 5, where 1 is lowest perceived quality, and 5 is the highest perceived.

Currently there are two main types of objective video degradation measurement processes:

1. Full reference methods (FR), where the whole original video signal is available
2. No-reference methods (NR), where the original video is not available at all Devices and processes of both types can be used in off-line systems (file-based environment) as well as in on-line systems (live video transmission).

The most widely used FR video quality metric during the last 20 years is Peak Signal-to-Noise Ratio (PSNR). PSNR is used approximately in 99% of scientific papers, but only in 20% of marketing materials. The validity of PSNR metric is limited and often disputed. This also applies to all PSNR derivatives, such as Structural similarity (SSim) and many others.

Among NR metrics the best known objective metric is PAR (Picture Appraisal Rating) algorithm jointly developed by BBC and Snell & Wilcox Ltd, UK. PAR is a single-ended (No-Reference) algorithm calculating the weighted sum of DCT quantization errors. PAR is calculated in the transform domain; the complete reconstruction of decompressed images is not required. The PAR error values are taken directly from the compressed stream data and the measurement results correlates with the subjective scores. Mapping PAR value (expressed in dB) to subjective 1 to 5 score is very simple:

PAR=50 dB is equivalent to subjective score 5 (excellent quality or imperceptible impairment), and PAR=30 dB is equivalent to subjective score 3 (fair quality or slightly annoying impairment).

Some commercially available software tools, such as Snell & Wilcox "Mosalina", utilize PAR for the objective measurement of compression artifacts.

DVD-making facilities have worked with PAR for quite a long time. USA Tektronix, Inc. produces "Cerify". This PC-based product combines several off-line tools, including the compression quality meter similar to "Mosalina". "VQMA" by VideoQ, Inc., the assignee of the present invention, is a stand-alone NR class video quality analyzer requiring the presence of special test pattern at the video processing chain input. VQMA is suitable for measurement of scaling and color space conversion artifacts—image geometry, image aspect ratio, levels of color components, frequency response, aliasing levels, etc. The weighted sum of VQMA measurement results can be mapped to composite distortion score expressed in dBqi. VideoQ also produces "StresTracker" dynamic test pattern suitable for objective measurement of compression artifacts by FR and NR meters.

One drawback of all abovementioned tools is that they provide only external connectivity and a-posteriori analysis. These tools are not integrated with the transcoding engine, thus they are not capable to provide early warning messages and feedback signals during the transcoding process. They only flag-out the degree of picture quality loss already introduced by the transcoding engine; so the user is forced to answer difficult question: does it make sense to re-start the whole file encoding/transcoding process from the very beginning?

Some mezzanine (post-production) encoders are capable to output metadata in a "texting" format, i.e. in form of short video fragment inserted before or after main video clip (media-info leader/trailer). Single alphanumeric page allows operator (compressionist) to see on a standard video monitor screen all details of the last codec settings, thus eliminating the need for any special analyzers or metadata readers. However, these auxiliary data describe only details of the last codec settings, not the complete processing history of the particular piece of content.

Certain software can provide built-in means of compression quality logging and on-the-fly reporting. For example, FFmpeg is an open-source software (GNU General Public License) that produces libraries and programs for handling multimedia data. FFmpeg reports on-line the quantization scales (Q values) used for each MPEG slice, thus providing for some degree of operational feedback. But it does not report the amount of damage (summary of DCT coefficients errors) caused by the application of these scales. However, FFmpeg's built-in quality meter uses the same unreliable PSNR values (FR metric) for objective quality loss reporting. Thus, the FFmpeg built-in PSNR meter cannot be used in the scaling mode, when the output picture size differs from the input picture size. Thus, conventional picture quality loss measurement technologies cover only some aspects of the problem.

On the other hand, long-term efforts of best experts in the analog broadcast TV resulted in the development of quite sophisticated algorithms for objective measurements closely correlated to subjective assessments. For instance, widely used K-factor (measured on Pulse & Bar test pattern) represents a maximum of 6 partial measurements. K-factor covers luminance sharpness, overshoots, ringing (ghost images) and white level non-uniformity (line tilt). The factor represents picture quality degradation as a single value, closely related to perceived picture quality. Mapped to 5-points subjective picture quality scale K=0% is equivalent to subjective score 5 (excellent quality) and 4% is equivalent to subjective score 3 (fair quality). This highly successful technique can be re-used with application to modern digital transcoding technologies.

Of course, the actual partial measurement algorithms and the scaling coefficients used to combine partial results and map them into one final score should be re-engineered, but the general approach and overall QC scheme may be inherited.

FIG. 1 illustrates a prior art video content processing system block diagram. It should be noted that prior art systems typically use external sources of test patterns and external devices to measure the quality loss due to the transcoding of video content.

Referring initially to FIG. 1, input video content package 102 (often referred as "container") typically contains descriptive metadata 104 as well as main video content data 106 of at least one video stream, e.g. in the MXF format it contains metadata and multiple streams wrapped together.

In test mode this input package 102 is replaced by the test stream 108, which may represent static or dynamic test pattern, or even short video clip—so called "reference video".

Via input selector 110 input data is fed to the video transcoder 112, typically consisting of several cascaded blocks, such as decoder 114 for decompressing video data to the baseband YUV/RGB format, scaler 116 for allowing desired modification of video frame size and/or video frame rate, pre-processor 118 to remove some picture components undesirable for the current encoding mode, and compression encoder 120 for compressing and formatting video data into a standard video stream, e.g. into MPEG2 transport stream or MXF stream/file.

Output video content package 122 also contains descriptive metadata 124 as well as processed video content 126, which in turn consists of at least one video stream.

In test mode the output package 122 is replaced by the processed test stream 128, which may represent static or dynamic test pattern, or reference video clip.

Transcoder 112 operates under control and supervision of an automated Media Asset Management System 130; in some applications the robotic part of MAM System 130 is combined with or replaced by human Operator (Compressionist). In any case transcoder usually works as a slave receiving from outside the Transcoding Preset 132 (set of the most important controls).

Quality Control in prior art system is available in two non-exclusive forms:

(a) Visual check and visual comparison of input image vs. output image on the screens of two video monitors 134 and 136, connected to the corresponding points of the transcoder 112, (b) Instrumental analysis of the discrepancies between input image and output image, performed by the Analyzer 138, containing a Picture Distortions Meter 140, which outputs QC Report 142; in some embodiment variants of the prior art system the Analyzer 138 may check only quality of the input stream or only output stream quality without any comparison of two streams.

Neither of two abovementioned QC tools is suitable for closed-loop transcoder settings optimization or automated distortions history logging/tracking. They provide "post-factum" analysis, suitable only for the initiation of re-work request in case of some serious image quality loss.

In modern Content Delivery Networks (CDN) video stream 126 of the output package 122 via the CDN "cloud" 144 feeds the video player 146 connected to the final destination display 148.

In some (advanced) embodiments of the prior art system the transcoder 112 via Media Assets Management System 130 may receive additional data from the destination player 146.

For example, if the network conditions (e.g. its instant transmission capacity, sometimes called "instant bandwidth") are temporarily worsening, then transcoder may compensate such network congestion by performing a short-term reduction of the outgoing stream bitrate. This creates an optional feedback control loop, shown on FIG. 1 which works as described below.

Current network conditions (Quality of Service) are permanently assessed by the player 146. Through a back-end communication channel 150 and Media Assets Management System 130, player assessment data are transferred to the transcoder 112, thus closing the performance optimization loop.

The implementation of the abovementioned optional optimization loop of the prior art systems does not involve any assessment of the actual content features or picture quality loss due to the transcoder operation. It is limited to the selection of the single item within a short list of pre-defined transcoder presets. Each such preset is pre-assigned (mapped) to the single item within the short list of expected network conditions.

The very important parameters of audio-visual content processing and delivery system are:
- spatial and/or temporal scaling of moving images and related artifacts
- color space conversion and related artifacts
- compression artifacts introduced by a chain of concatenated codecs.

Together these parameters define the degree of overall picture impairment (quality loss), which depends mainly on factors of picture degradation and/or picture distortion on the way from the content originator via content distribution channel(s) to the content consumer.

To optimize the system operation and provide high quality content output it is highly desirable to introduce economically viable, fast, and reliable methods providing for objective measurement of video quality at every step of video data processing workflow.

Important feature of modern digital content delivery system is that the abovementioned quality parameters may vary depending on:
- Area location within the image (spatial profile)
- Current timeline position (temporal profile)
- Test point within the data transmission path (cumulative impairment profile)

The quality impairment estimation becomes even more complicated when the video content processing system uses modern sophisticated solutions such as variable frame-rate, variable bitrate and/or switchable video frame size.

Many broadcast TV, IPTV and content delivery experts, still think that the main problems are in the fields of interoperability and compatibility, plus well known issues linked with the Quality of Service. Quality of Service should not be confused with the Quality of Experience, though quite often service providers state than their Quality of Service is great, deliberately avoiding the Quality of Experience issues.

Due to the astonishing progress in the Quality of Service area, majority of interoperability problems are being solved. Unified server-based solutions are on the way. In the most optimistic variant the message is "Produce and pack your content in a format compatible with some platform, all other functions will follow automatically".

However, the Quality of Experience issues, i.e. the issues related to handling of picture quality degradation in concatenated scalers/codecs, are mainly unresolved. Quality Assurance implies Quality Control (QC), which in turn requires reliable, repetitive and objective measurements.

Video content re-purposing and delivery system QC should be fully automatic for checking thousands of channels and hundreds of formats semi-automatically is not an economically viable option. Periodic checks, polling schemes and similar techniques are unreliable—miss probability is unacceptably high. Deployment of thousands of stand-alone monitoring devices is unrealistic and uneconomical. Thus, fundamentally different video transcoding workflows and video QC technologies are needed.

SUMMARY

In one aspect, a system to perform automated conversion of video data includes a transcoder with a decoder processing video data for automatic video format detection and conversion of video data into uncompressed format; and an image scaler coupled to the setting controller to perform automatic video image size conversion based on horizontal and/or vertical scaling factors. The system also includes a video data pre-processor for compression of video data; a compression encoder to convert video data into compressed format; and a degradations and distortions meter (video quality analyzer) to process video data and data generated by said transcoder.

In one implementation, the system provides for enhanced video content data processing and automated Video Quality Control measurements by (1) installation within video transcoder a Degradations & Distortions Meter, which assembles and processes partial quality control data coming from main video transcoder building blocks, (2) addition of a Metadata Processor, Impairment Score Aggregator and QC Report Creator block, which converts the assembled and processed quality information into QC Report, and (3) broadcasting of thus created QC Report via LAN/WAN and other available communication channels, as well as insertion of the embedded QC Reports into the outgoing stream(s) of video data.

Moreover, the video data processing system can be used in a larger scale ecosystem, utilizing QC Reports coming from cascaded or concatenated video content processing devices for optimal control of these devices, both on local level, i.e. within each device, and on higher level(s), e.g. via Media Assets Management System(s).

BRIEF DESCRIPTION OF THE DRAWINGS

Embodiments of the invention described herein will become apparent from the following detailed description considered in connection with the accompanying drawings, which disclose several embodiments of the invention. It should be understood, however, that the drawings are designed for the purpose of illustration and not as limits of the invention.

FIG. 5 shows an exemplary table of quality impairment calculations.

FIG. 6 shows an exemplary quality control report structure.

DETAILED DESCRIPTION

Figure 1:
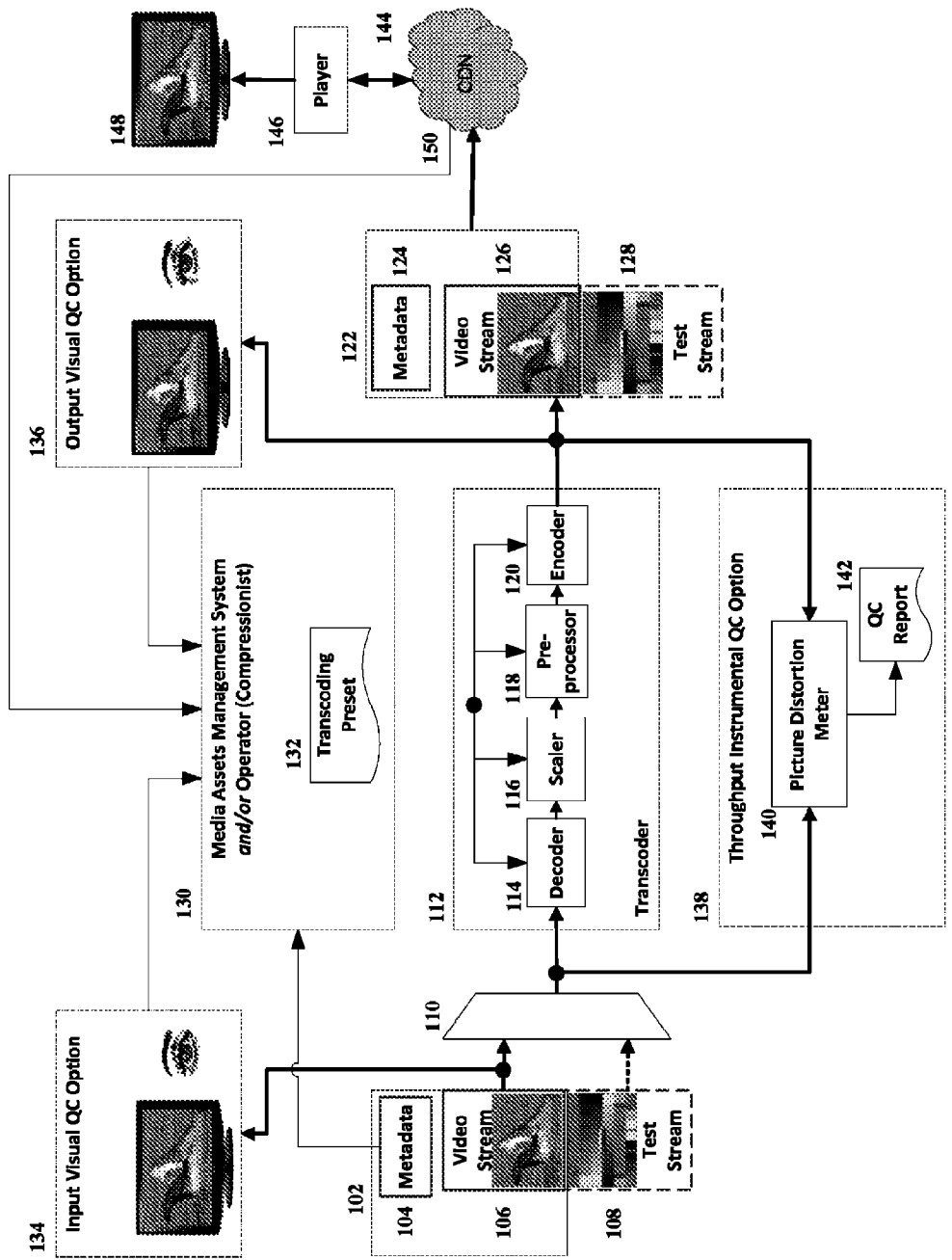
FIG. 1 illustrates a prior art video content processing system block diagram.
Figure 2:
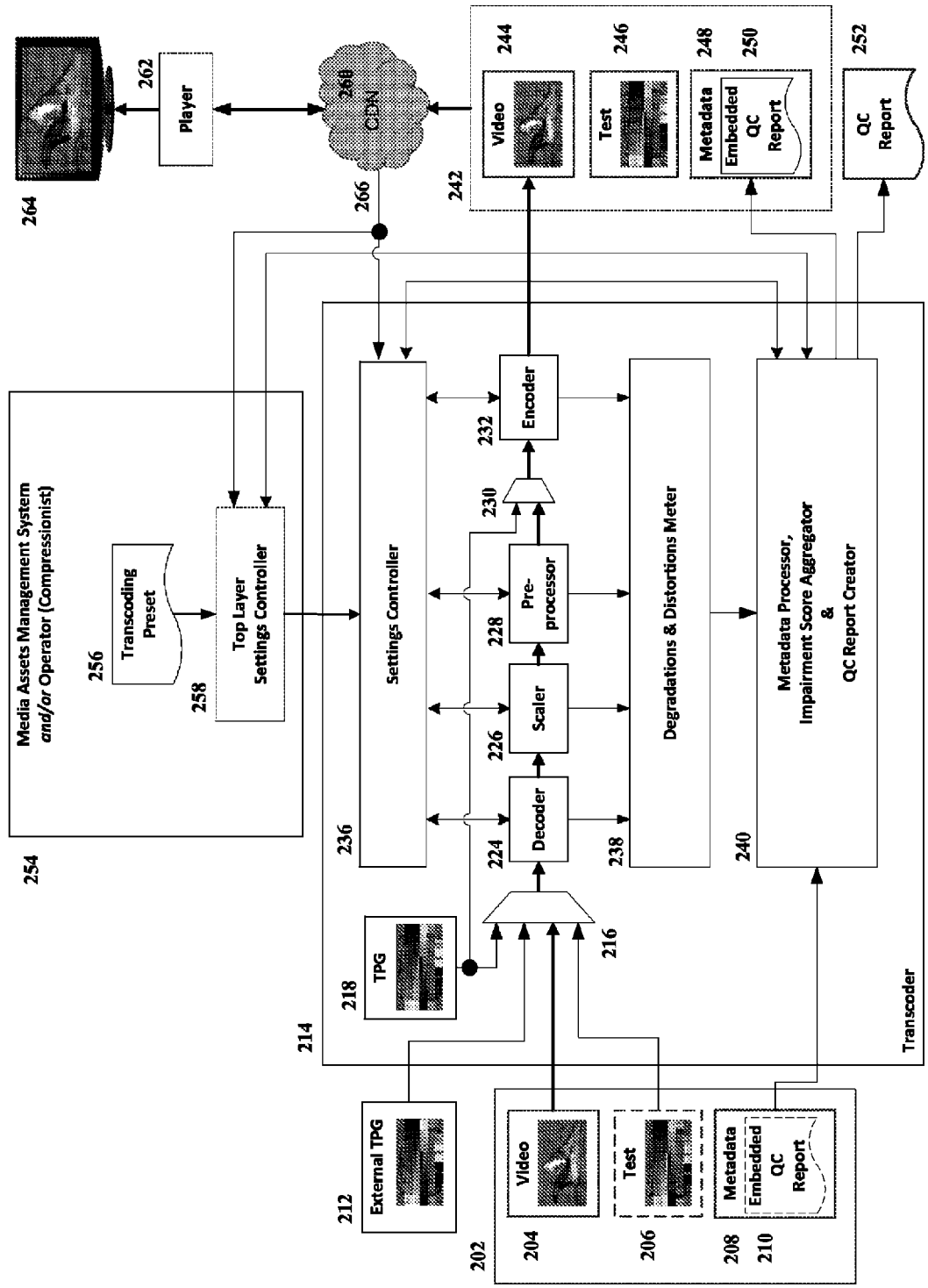
FIG. 2 shows one embodiment of a video content processing system block diagram.

FIG. 2 shows one embodiment of a video content processing system block diagram. In this embodiment, the system's picture quality control is an inherent part of the system, thus providing for more stable operation and better results. The embodiment of FIG. 2 is particularly advantageous in digital video transcoding systems, especially to the hardware and software systems and devices used for multi-format content production, post-production, re-purposing and delivery. It is particularly efficient with application to Content Delivery Networks (CDN).

Referring now to FIG. 2, input video content package 202 contains main video content data 204 of at least one video stream. Unlike prior art system, this test stream 206 is packed inside the input package 202, and the package metadata 208 includes not only traditional descriptive metadata, but embedded QC Report 210 as well. This arrangement can still work with the traditional test mode setup using an external Test Pattern Generator (TPG) 212.

Video transcoder 214 via the input selector/multiplexor 216 can control the selection and/or multiplexing of input data available from four sources:
(a) External Test Pattern Generator 212
(b) Built-in Test Pattern Generator 218
(c) Main Video Content Stream 204
(d) Embedded Video Test Stream 206

All types of video data are processed by the decoder 224, scaler 226, pre-processor 228, and finally by the compression encoder 232. The system can work in five modes of operation described below.

Selection of main video content stream 204 or external TPG stream 212 enables two modes of operation as follows:
(a) Normal (Main) Mode, in which the transcoder 214 processes main video content stream 204
(b) External Test Mode, in which the transcoder 214 processes external TPG stream 212.

The system provides for three more test modes:
(c) Internal Test Mode (Self Test), in which the decoder 224 via selector/multiplexor 224 receives video data from built-in TPG 218—instead of or together with the main video content data 204. This mode allows nearly instant objective measurement and reporting of the current degree of image quality impairment, introduced by the transcoder itself—even in absence of the external test sources.

(d) Wider Area Test Mode, in which the transcoder 214 processes video test stream 206 embedded in the input content package 202. This very important mode allows measurement of accumulated image quality impairment of all concatenated codecs within the long Content Delivery Network processing chain—from content origination or play-out to the final destination player.

e) Test Pattern Generator Mode, in which the encoder 232 via the selector/multiplexor 230 receives video data from built-in TPG 218. This allows local generation of new "pristine" video test stream, especially valuable for testing the down-stream devices. This test stream may replace the original content or co-exists with it in the output package. It should be noted that the "pristine" test generation may happen in parallel with the main content processing; test stream generation usually requires only a small fraction of the available transcoder resources.

In one embodiment where the video processors are based on multi-thread parallel calculation schemes, the processing of all test streams may happen simultaneously with the main video content processing. And all parallel threads can be controlled by the same settings; thus the impairments of main video stream, e.g. color space errors or frequency response distortions, can be assessed by objective measurement of the corresponding impairments of test streams.

Thus, current transcoding quality and history of image quality impairments can be assessed online and reported online by way of objective measurements of the test streams.

Next, the control of the system function is discussed. Decoder 224, scaler 226, pre-processor 228, and encoder 232 get their settings (controls) from the Settings Controller 236. Functions and connections of the Settings Controller 236 now described. The top layer controls of the system come from an automated Media Asset Management System 254; in some applications the robotic part of MAM System 254 may be combined with or replaced by human Operator (Compressionist).

Original Transcoding Preset 256 values are optimized by Top Layer Settings Controller 258. This modification happens at the pre-defined update rate and optimized settings are sent via a communication channel, typically via LAN/WAN, to the transcoder 214.

The Degradations & Distortions Meter 238 permanently receives from decoder 224, scaler 226, pre-processor 228, and encoder 232 all necessary quality-related data, such as spectral transform coefficients, scaling aperture coefficients, quantization scale numbers, etc.

Degradations & Distortions Meter block 238 converts these data into partial quality impairment values and transfers them to Metadata Processor, Impairment Score Aggregator and QC Report Creator block 240.

Block 240 further process partial quality impairment values and combines them with the data available from Embedded QC Report 210. The data, resulting from this process, are supplied with the appropriate formatting to the following destinations:
 (a) Settings Controller 236
 (b) Top Layer Settings Controller 258
 (c) Embedded QC Report 250 contained in the output package 242
 (d) External QC Report 252 transmitted or broadcasted via standard LAN/WAN means.

Thus, output video content package 242 contains processed video content 244, at least one video test stream 246, and metadata portion 248, which includes Embedded QC Report 250.

Unlike prior art system, testing of the transcoder performance does not always require replacement of the video content by test pattern. In the system test streams co-exist with main content streams within the output package 242. The duration of the test streams can be the same as the duration of the main video stream or much shorter, thus saving valuable processing resources and CDN resources.

The multi-test-streams arrangement provides for local insertion, deletion or replacement of the particular test streams. This, in turn, provides for a variety of test modes, managed by upper layer system controls:
 (a) Off-line (maintenance) tests,
 (b) On-line (local, national and global—independently and simultaneously) transmission tests.

One important feature of the system is that quality impairment information is available in real time by analysis of both test patterns and live video content. This allows closed-loop optimization of the transcoding process. There are two feedback loops:
 (a) Outer loop, including MAM system 254, which accumulates data from block 240
 (b) Inner loop, closed by the link of block 240 with built-in Settings Controller 236.

Thus, Settings Controller 236 makes its decisions using two types of data:
 (a) Modified Transcoding Presets coming from external MAM system 254 (outer loop)
 (b) Current Quality Impairment data coming from block 240 (inner loop).

Feedback gains and other response parameters of two loops may vary significantly depending on the type of codec used, bitrate range, decoder buffer size, etc. Usually, they are customized to achieve optimal operation of the particular system. The system can thus operate as double-loop feedback systems known to those skilled in the art.

Video stream 244 of the output package 242 via the CDN "cloud" 260 feeds the video player 262, which is connected to the final destination display 264. As in the prior-art system transcoder 214 may receive some feed-back data from the destination player 264. This creates one more (optional) control loop, also shown on FIG. 2. For example, the feed-back data may describe current network conditions permanently assessed by the player 262.

Via the back-end communication channel 266 player assessment data are transferred to the transcoder setting controller 236 and to the top layer setting controller 258, thus closing the third optimization loop.

It should be stressed that, unlike prior-art systems, this third control loop does not directly apply any particular transcoding settings, but interacts with other system control components in more sophisticated way, e.g. by shifting (biasing) the target values or limits for two other optimization loops mentioned above. Such approach allows to take into account both current network conditions and current picture properties. This results in better compromise between:
 (a) Unavoidable picture quality impairment due to the temporary restrictions on transcoder parameters, such as output bitrates range, decoder buffer occupancy, etc,
 (b) Risk of even bigger impairments, which may be caused by mismatch of current output stream parameters with reference to current, temporally worsened, CDN conditions.

Another difference from prior art system is that actual optimized transcoder settings are not only applied, but they are also fully documented in the dedicated section of the QC report—together with the parameters and/or factors requiring the modifications applied.

Of course, such complex CDN architecture does not exclude system operation in simplified modes. This applies to each and all of the abovementioned types of the feed-back loops.

In particular, the system may operate in simple open-end mode, in which the feedback data are not available, or they are available, but not used. For example, open-end mode can be forced by decision of human operator for debugging or maintenance purposes.

The enhanced Video Content Processing System improves the efficiency and performance of overall video content production and delivery system by way of addition of built-in video quality control sub-system(s). This addition is a key factor providing for creation of video quality control and video quality stabilization closed loop feedback systems—as opposite to the prior-art open loop systems.

Every-day operation, acceptance tests, maintenance tests and benchmarking comparisons of any consumer or professional device or system that has the ability to transcode audio-visual signals, may involve the use of the system according to this invention.

The instant system is equally applicable to all known video compression algorithms based on the adaptive non-linear quantization of the transform coefficients. The list includes commonly used lossy compression methods, such as all versions and variations of DCT-based JPEG and MPEG, as well as the newest wavelet-based methods.

All above mentioned methods use some ordered set of the transform coefficients, ranging from the lowest spatial frequency (usually DC) to the highest spatial frequency, plus some ordered set of non-linear quantization scales applied to these coefficients.

Knowledge of the rules and parameters, used by particular compression method, allows creation and application of a weighting function linking the cumulative distortion of the transform coefficients to the corresponding loss of subjective quality.

The following description of the present invention is done by the way of non-exclusive example of how one embodiment of the Video Content Processing System (VCPS) would work in an environment where video content is distributed via some data-processing and/or data-casting services. The application of the system is especially useful where such services are utilizing networks or "cloud" channels with unstable or variable resources allocation.

One embodiment of the video content re-purposing and delivery workflow and new QC methodology (in particular—scaling and compression artifact measurements) is based on built-in meters, networked media assets management databases and global network reporting. The system replaces current cumbersome, misleading and unreliable techniques, such as PSNR and its derivatives, based on output pixels vs. input pixels comparison performed by external QC monitoring devices. PSNR technique is based on the assumption that the goal of the video content delivery system is to provide the output pictures matching the original pictures in size, aspect ratio and timing profile. However, this assumption is simply not valid for modern multi-format systems. When applied to the transcoding systems, the instant QC methodology not only provides "peace of mind", but also provides for significant bitrate/bandwidth saving and/or image quality improvement. In absence of appropriate QC sub-systems compressionists and CDN managers use higher bitrates "just in case". Typical transport stream may contain up to 80% of bit-stuffing!

With the instant QC methodology partial measurement results can be mapped to some unified quality degradation scale and then combined in accordance with well-defined rules providing spatial and temporal image quality profiles as well as higher level estimates for overall long-term quality degradation—ideally resulting in one value describing the video quality impairment of the whole video clip at the CDN output test point vs. its input, i.e. original content.

Figure 3:
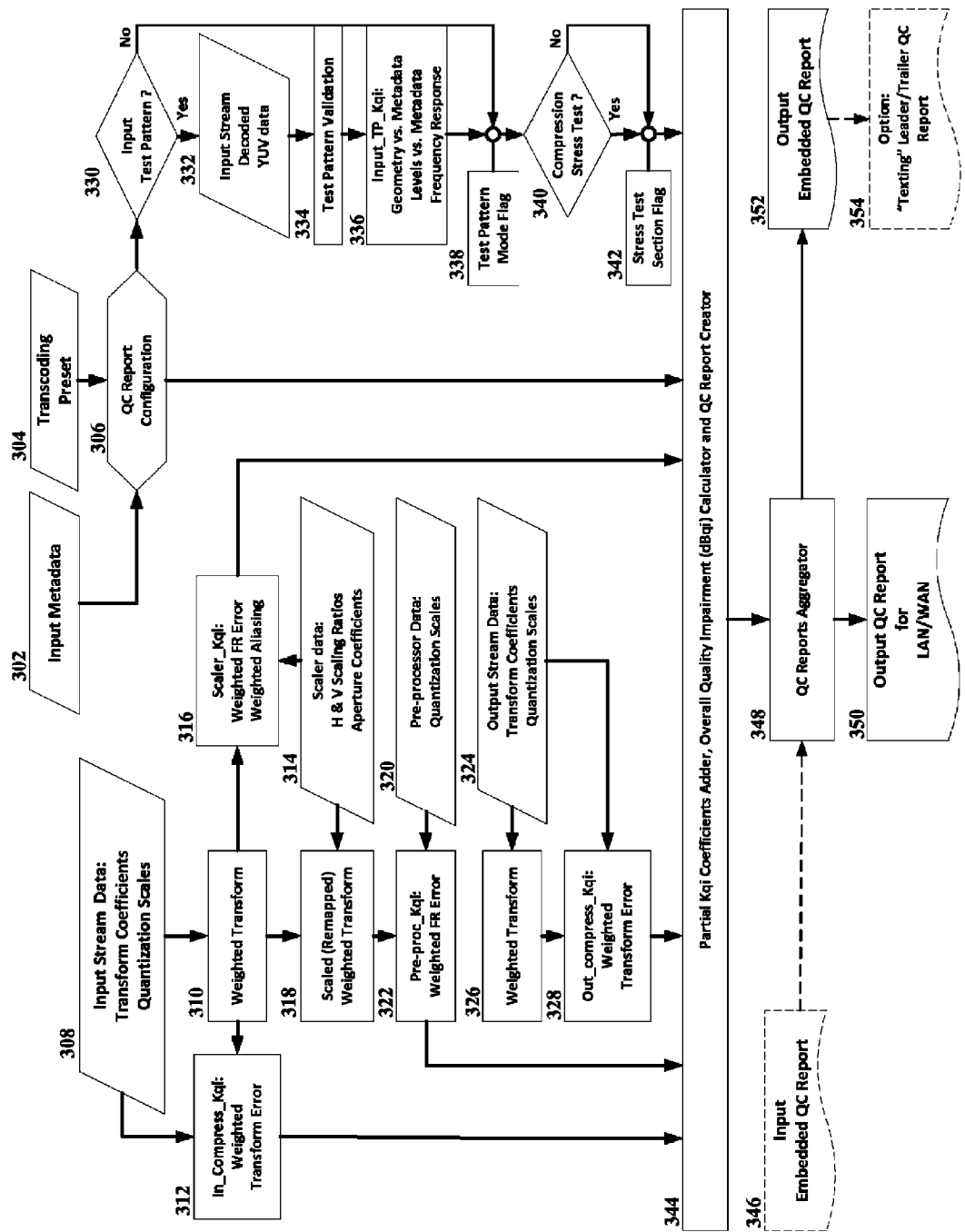
FIG. 3 shows an exemplary transcoder data processing and quality control workflow diagram.

FIG. 3 shows an exemplary workflow diagram of the hardware and/or software data processor implementing the proposed transcoder quality control system. First, step 306 defines a Quality Control Report configuration (Test Case configuration). This step is based on Input Metadata 302 and Transcoding Preset 304 data coming from outside. The results of this step affect a set of calculations in block 344 as explained in more details below. In case of test stream processing these results also affect steps from 330 to 342 as explained in more details below.

Incoming main video stream data 308 are processed in blocks 310 and 312. Block 310 converts incoming spectral domain data (spectral transform coefficients) into weighted transform. For example, this step consists of relative depreciation of less visible high frequency component vs. more visible low frequency components. Weighting functions use pre-defined image resolution dependant coefficients; they are based on well-known results of human vision characteristics.

Block 312 accumulates weighted video data quantization errors. This includes multiplication of the quantization error by the weighted energy of particular spectral component, which was impaired by the application of this quantization scale. The whole process is well known from prior art PAR algorithm description.

Result of this stage is In_Compress_Kqi coefficient representing Input Weighted Transform Error, i.e. integral of all spectral transform errors due to coarse quantization of these spectral components in the last codec supplying input video stream to the Decoder module 224.

If Transcoding Preset 304 requires spatial scaling (i.e. change of image resolution), then QC Report should include Scaler_Kqi coefficient representing Weighted Frequency Response Error and Weighted Aliasing Error (the last one—only in case of down-scaling). These are calculated in block 316 using the data coming from blocks 310 and 314.

Block 318 calculates Scaled (Remapped) Weighted Transform, which is similar to Weighted Transform calculated by block 310. The only difference is that block 318 uses different set of weighting coefficients. In case of image size down-conversion block 318 operates with a sub-set of spectral domain data produced by simple array size truncation, thus limiting the highest frequencies involved to the Nyquist Limit H & V spatial frequencies known from the H & V Scaling Ratios coming with the Transcoding Preset 304.

Scaler data 314 concerning H & V Scaling Ratios and Aperture Coefficients are used in blocks 316 to calculate Scaled (Remapped) Weighted Transform and in block 318 to calculate Weighted Frequency Response Error and Weighted Aliasing Error. Together these two provide for calculation of Scaler_Kqi, i.e. Scaler Impairment assessment.

Block 322 calculates Pre-proc_Kqi representing Pre-processor Weighted Frequency Response Error. Block 322 uses Pre-processor Data 324, in particular its Quantization Scales. Block 322 operation is similar to blocks 312 and 316; main difference is the source of quantization scales data.

Blocks, 326 and 328 calculate Out_compress_Kqi representing Weighted Transform Error of the outgoing video stream. Their operation is similar to blocks 310 and 312, but they use transform and quantization scales data 324 available from the compression encoder.

All partial Kqi coefficients are combined together in block 344, which also provides for Overall Quality Impairment (dBqi) calculation.

In Test Mode the availability of special artificial Test Patterns allow calculation of some extra parameters describing the image processing impairments in more details.

First step in this process is the detection of Test Stream Mode in block 330.

In this mode decoded YUV data 332 are first validated in the Pre-Analyzer block 334 and then processed by the Analyzer block 336. This results in the calculation of Input_TP_Kqi coefficient combining Geometry vs. Metadata Errors, Levels vs. Metadata Errors, and Frequency Response Errors. For example, input metadata may describe image aspect ratio as 16:9, but automated analysis in block 336 may show 2.15:1. If detected, such serious error should be part of QC Report.

Another example is possible mismatch of color scheme declared in the metadata with the RGB/YUV levels measured on artificial Test Pattern.

Test Pattern Mode Flag 338 and optional Stress Pattern Flag 342 serve for enabling the corresponding analysis modules and corresponding sections of final QC Report.

Test Patterns, including Compression Stress Tests, and automated analysis procedures used for measurement of various impairments of these Test Patterns are described elsewhere.

Block 344 summarizes results of all the abovementioned calculations in the corresponding sections of Transcoder QC Report supplied to QC Reports Aggregator block 348.

Block 348 combines internal Transcoder QC Report data coming from block 344 with the optional data of Input Embedded QC Report 346. Combined QC Report data are formatted for two destinations:

(a) QC Report 350 for LAN/WAN broadcasting, (b) Embedded QC Report 352 going out within the output stream.

Embedded QC Report 352 may also contain optional Texting Leader/Trailer QC Report 354. "Texting" here means on-screen display of QC Report data in form of a table suitable for fast reading by human operator. "Leader/Trailer" here means that corresponding text page or group of pages is inserted in the main video stream either before or after main video clip.

Embodiments of the QC system described above can include one or more of the following features:
- All relevant parameters, degradations, distortions and compression artifacts are known internally, so they can be measured and reported by the transcoder itself
- Existing transcoders can be upgraded to do the distributed QC job through additional built-in meters and links
- Quality degradation measurements procedures are applicable both to live pictures and to artificial test patterns; for example scaling artifacts can be measured with high accuracy on optional short video test steam or leader/trailer/insert, featuring special test patterns
- Technical metadata reporting & embedding provide for video content processing database history records
- Compression artifacts and other QC values self-reporting creates ecosystem of "smart and honest" video devices, thus providing for more efficient video transcoding workflow in general.

In one embodiment, the unified quality degradation scale is called dBqi (qi stands here for quality impairment). It relates to widely used dBu, dBm, dBfs, etc. units because of the logarithmic character of the scale and the simple addition rule used to calculate cumulative impairment as a linear sum of dBqi values of all concatenated scalers/codecs. The smallest dBqi value is zero—it designates the case of lossless compression without any picture degradation. Other picture transformations are usually associated with some degree of degradation. For example, high quality picture down-scaling with zoom factor 50% can be mapped as 6 dBqi; further down-scaling to 25% means further degradation (plus 6 dBqi) totaling 12 dBqi, and so on. Up-scaling process typically does not introduce any significant degradation. For example, overall dBqi value for two cascaded scalers (down from 100% to 50% and then up from 50% to 100%) is slightly above 6 dBqi (about the same as 6 dBqi of 100% to 50% down-scaler).

Image Quality Degradation should not be confused with Image Distortions. For example, ownsizing of high-quality 1920×1080 image to 720×480 definitely means degradation with well-known difference in subjective quality scores of two images. On the other hand, depending on the technical performance of the particular scaler it may be accompanied by some image distortions: for example the visual image sharpness and the amount of residual aliasing components may vary significantly.

Figure 4:
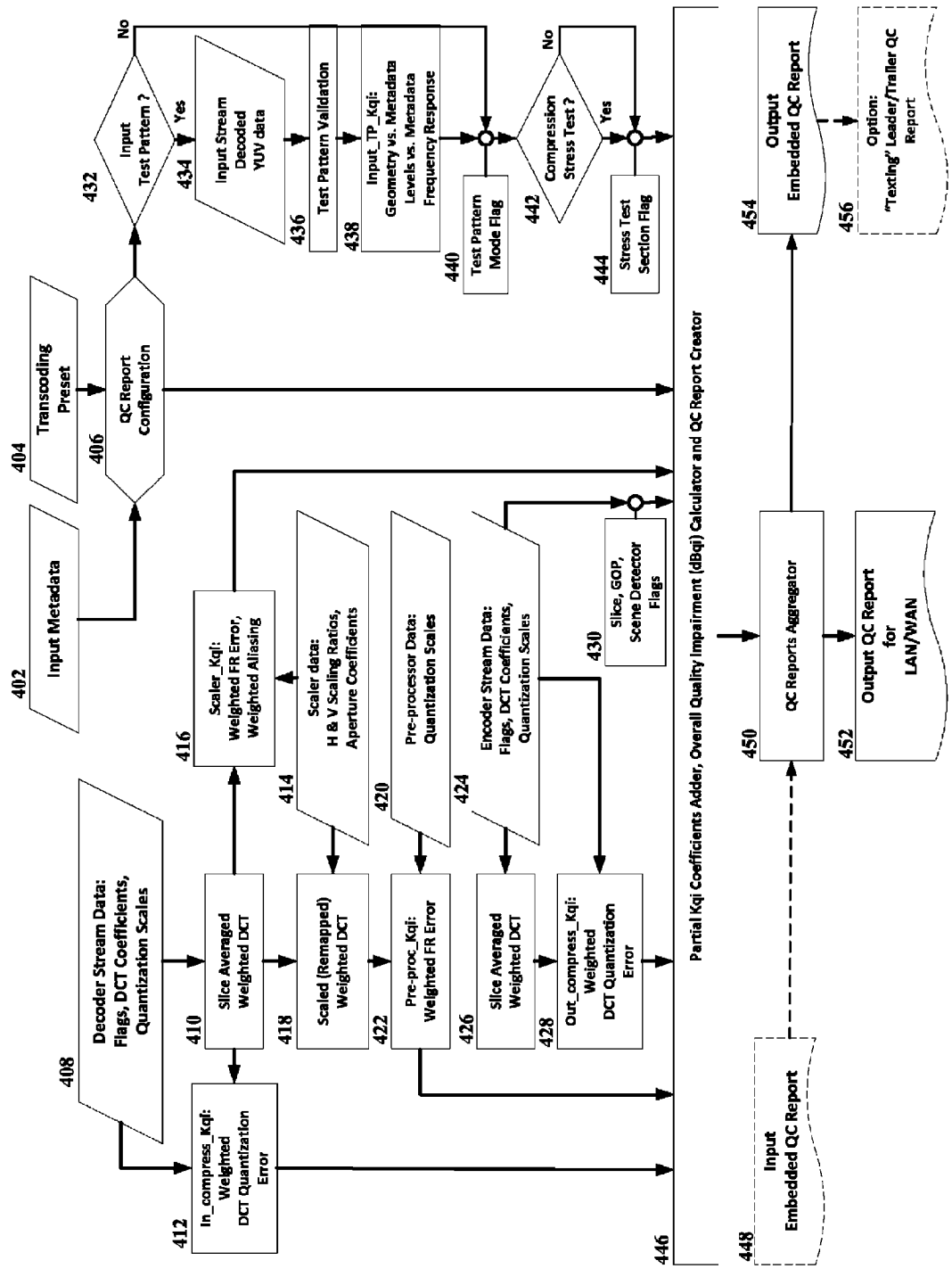
FIG. 4 shows an exemplary MPEG transcoder data processing and quality control workflow diagram in accordance with this invention.

FIG. 4 shows the example of workflow diagram of proposed transcoder quality control system in case of MPEG transport stream data processor quality control. Steps 402-406, 432-444 and 448-456 are similar to the corresponding steps 302-306, 330-342 and 346-354 already described above.

The specific features of MPEG standard are:
(a) Spectral transform data are represented by DCT (Discrete Cosine Transform) coefficients,
(b) Video data coding is organized in picture slices and GOP (Group Of Pictures) format.

These MPEG specific features are taken into account within the QC data processing workflow diagram.

Steps 408-428 are similar to the corresponding steps 308-328 already described above, but the FIG. 4 example of QC data processor is dedicated to MPEG video data, such as DCT, and the QC results are sorted by MPEG stream slices. Thus, in case of MPEG stream transcoding final QC Report contains more detailed representation of compressed image impairments.

Additional block 430 provides Slice, GOP, and Scene Detector Flags, highlighting the time-line positions of measured impairment coefficients. These flags provide for additional QC Report sections, in which the compression artifacts analysis results are correlated with particular structural elements of MPEG stream. Such data are especially valuable for MPEG Transcoding Pre-set optimization—buffer controls, bitrate controls, GOP structure controls, etc.

FIG. 5 shows an example of Quality Impairment calculations:
(a) Perfect 1280×720 test pattern as it should be in accordance with technical metadata
(b) Actual "Post stamp" image (geometry error) with some additional distortions
(c) Fragment of Quality Analysis Table Next, examples of Partial Quality Impairment Weighting Functions for different types of impairments will be discussed. Some of these functions are of a simple linear weighting type. For example, in case of color saturation (UV Gain vs. Y Gain) errors each 1 dB of gains mismatch contributes 0.5 dBqi to the final Total Quality Impairment Score expressed in dBqi. However, other weighting functions may use more complex models.

FIGS. 5(a)-5(c) show examples of Quality Impairment calculations. FIG. 5(a) shows an exemplary perfect 1280×720 test pattern as it should be in accordance with technical metadata. FIG. 5(b) shows an exemplary actual "Post stamp" image with some additional distortions. FIG. 5(c) shows an exemplary Fragment of Quality Analysis Table. As shown below, the table shows, among others, examples of Partial Quality Impairment Weighting Functions for different types of impairments:

| Parameter | Metadata value or assumed correct value | Measured value | Partial Quality Impairment Weighting Function | Type | Kqi dBqi |
|---|---|---|---|---|---|
| Frame Size, H × V | 1280 × 720 | 1280 × 720 | 0, 100 if abs(H − H0) + abs(V − Vo) > 0 | 3 | 0 |
| H & V zoom, Zh × Zv | 1.0 × 1.0 | 0.75 × 0.75 | 6 * (abs(Zh − 1) + abs(Zv − 1)) + 12 * abs(Zh − Zv) | 1 | 3 |
| Frequency Response, dB @ 400 tvl | 0 | −3 | 0.25 * (V/Ftvl) * abs(FRdb) | 2 | 1.35 |

-continued

| Parameter | Metadata value or assumed correct value | Measured value | Partial Quality Impairment Weighting Function | Type | Kqi dBqi |
|---|---|---|---|---|---|
| Alias Response, dB @ 600 tvl | −40 | −10 | 20 * (V/(Ftvl * (abs(ARdb) + 1))) − 0.6 | 2 | 1.56 |
| UV gain − Y gain, dB | 0 | −1.6 | 0.5 * abs(UVgain) | 2 | 0.8 |
| | | | Degradations Score, dBqi | | 3 |
| | | | Distortions Score, dBqi | | 3.71 |
| | | | Total Quality Impairment Score, dBqi | | 6.71 |

Type:
1 - Degradation,
2 - Distortion,
3 - Catastrophic Error (operation aborted, if > 0)

For example, in case of Frequency Response errors the weighting function in the corresponding row of FIG. 5 table uses two arguments—actual Frequency Response error (in dB) and spatial frequency (in tvl normalized to the V Size of the image) at which this error was measured.

In one embodiment, impairments are sorted into three Types:
(1) Degradation, e.g. down-sized image
(2) Distortion, e.g. Color Saturation Error
(3) Catastrophic Error (operation aborted, if >0).

This is helpful for top level decision making, e.g. in case of Type 3 impairment detection, normal automated process should be aborted and alarm flag raised; then system should request the human operator intervention.

FIG. 6 shows an example of Quality Control Report Structure. In the preferred embodiment, mandatory input metadata section is at the very beginning. Next several sections are dedicated to the measured impairments at input, intermediate and output test points within current transcoder. Some sections are mandatory, but some others are optional. For example the Quality of Service data can be included or excluded, depending on QC Report Configuration set described above. Final sections of said QC Report are reserved for optional prior QC Reports inclusion. If available, these prior QC Reports are appended to full QC Report. Thus, the complete QC Report size is incremented at each stage, while propagating through the chain of concatenated codecs. The prior QC Report of the last codec (prior to the current transcoder) always appears at the very end of complete QC Report. Prior QC Reports can be either of Embedded QC Report type, i.e. supplied within the input stream, or External QC Reports, e.g. supplied via LAN. The prior QC Report origination details are flagged within the corresponding QC Report section header.

In one embodiment, final image quality impairment score (expressed in dBqi) may be composed as a (linear or non-linear) combination of degradation score and distortion score. The degradation score is not a static factor and may vary depending on the quality of incoming images. For example, down-scaling and low bitrate encoding of HD talk-show pictures containing mainly static out-of-focus background may not introduce any significant degradation. On average the degradation score can be predicted and calculated via simple comparison of input and output stream metadata. However, the distortion score can be calculated by on-line or off-line analysis of the particular transcoder transforming the particular content under control of predetermined particular settings. Allocation of the weighting coefficients used to combine degradation and distortion scores can be customized depending on the application or preferences of the particular user. An exemplary report is as follows:

| Item | Description | Optional |
|---|---|---|
| General QC Report Info | Date, Location, Organization, Equipment, QC Report Originator, QC Report URL, etc | |
| General Content Info | Standard tagged list Title, Copyright, Type, Author, Originator, URL, ADID, UMID, etc | |
| Input Media Information | List of streams, followed by streams technical metadata: duration(s), format(s), codec(s), frame size, color space, aspect ratio(s), interlace ratio, frame rate, maximum bit rate, average bit rate, etc | |
| Input Quality of Service | Front-end Packets Drop Rate, Frame Drop Rate, Frame Freeze Rate, Maximum Freeze Duration, etc | X |
| Output Media Information | List of streams, followed by streams technical metadata: duration(s), format(s), codec(s), frame size, color space, aspect ratio(s), interlace ratio, frame rate, maximum bit rate, average bit rate, etc | |
| Output Quality of Service | Back-end Communication Channel Messages Log, etc | X |
| Transcoder Global Settings | Scaler settings (zoom, crop, aperture coefficients), pre-processor settings, buffer controls, minimum and maximum quantizer scales (Q values: IQ, PQ, BQ), etc | |
| Transcoder Timed Settings | Differential settings of M time segments (if applicable): Segment #1, time interval from . . . to . . . . . . Segment #M, time interval from . . . to . . . | X |
| Transcoder QC Report Summary | Input Content Quality Impairment, dBqi, Throughput Content Quality Impairment, dBqi, Input & Throughput Content Quality Impairment, dBqi | |

-continued

| Item | Description | Optional |
|---|---|---|
| Transcoder Detailed QC Report | Scaler Content Quality Impairment, dBqi, Preprocessor Content Quality Impairment, dBqi, Encoder Content Quality Impairment, dBqi, | X |
| Transcoder Test Report | Test Streams List: Incoming Test Streams detected Outgoing Test Streams, inserted and/or copied from input Test Pattern(s) Impairments, input and/or throughput: Geometry (zoom & pan), video levels (colors), Frequency Response, Stress Test Response | |
| Prior QC Reports Prior Reports Summary | N = N1 + N2: total number of appended prior QC Reports N1: number of Embedded QC Reports copied from input stream N2: number of QC Reports imported from other designated sources | X |
| Prior QC Report # N | | X |
| ... | | X |
| Prior QC Report # 1 | | X |

Thus, the final quality impairment score can be accompanied with a special note, such as "scored in accordance with xyz.org rules". Ideally, these rules must be set by national and/or international standardization bodies. In any case, even "locally customized" picture quality score is better option than no score at all.

For engineering purposes it is advantageous to keep the complete history of changes for both types of the abovementioned quality parameters. However, for commercial use the overall (composite) quality impairment score is more important than the processing history and details of the contributing factors.

To satisfy all the requirements, the system provides detailed processing quality log (history) as well as final quality score (cumulative composite impairment score). The resulting QC Reports can be presented in at least two formats:

Embedded QC Report—as part of video package technical metadata distributed (wrapped) together with video stream(s)

Stand-alone machine-readable QC Report—for content management systems and commercial applications, typically reachable via LAN/WAN connection.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A video transcoding system to perform automated conversion of video data, comprising:
   a transcoder including:
      a decoder processing video data for automatic video format detection and conversion of video data into uncompressed format; and
      an image scaler coupled to the setting controller to perform automatic video image size conversion based on horizontal and/or vertical scaling factors;
      a video data pre-processor for compression of video data;
      a compression encoder to convert video data into compressed format;
      a meter for degradations and distortions (video quality analyzer) to process video data and data generated by said transcoder; and
      a report generator coupled to the degradations and distortions meter to provide a quality control report, wherein the report generator selects one from at least two formats:
         an Embedded QC Report as part of video package technical metadata distributed or wrapped with a video stream; and
         a Stand-alone machine-readable QC Report for content management systems, wherein the report generator determines a unified quality impairment (gi) degradation scale.

2. The system of claim 1, wherein the degradations and distortions meter receives quality-related data including spectral transform coefficients, scaling aperture coefficients, quantization scale numbers and generates partial quality impairment values.

3. The system of claim 1, wherein the transcoder receives an input video content package containing video content data and a package metadata with descriptive metadata and embedded quality control (QC) Report.

4. The system of claim 1, wherein the transcoder receives a video stream from one of: an External Test Pattern Generator, a Built-in Test Pattern Generator, a Video Content Stream, and an Embedded Video Test Stream.

5. The system of claim 1, comprising a video processor processing test streams simultaneously with main video content, where parallel threads are controlled by the same settings where impairments of the video stream is assessed by objective measurement of corresponding impairments of test streams.

6. The system of claim 1, wherein the degradations and distortions meter generates a final image quality impairment score.

7. The system of claim 1, wherein average degradation scores are determined by a comparison of input and output stream metadata and wherein distortion scores are determined by analysis of a transformation of video content using predetermined settings.

8. The system of claim 1, wherein the degradations and distortions meter generates quality impairment information in real time.

9. The system of claim 1, wherein the transcoder optimizes the transcoding process with closed-loops.

10. The system of claim 1, wherein the degradations and distortions meter provides two feedback loops:
    (a) an outer loop, including a media asset management (MAM) system; and
    (b) an inner loop closed by the link of a metadata processor with built-in settings control.

11. The system of claim 10 wherein the degradations and distortions meter provides a third feedback loop.

12. The system of claim 1, a setting controller to provide automatic control of said transcoder.

13. The system of claim 12, wherein the settings controller analyzes Modified Transcoding Presets from a media asset management (MAM) system (outer loop) and Current Quality Impairment data (inner loop).

14. A video transcoding system to perform automated conversion of video data, comprising:
    a transcoder including:
       a setting controller to provide automatic control of said transcoder;
       a decoder coupled to the setting controller for automatic video data format detection and conversion of video data into uncompressed format; and
       an image scaler coupled to the setting controller to perform automatic video image size conversion based on horizontal and/or vertical scaling factors;
       a video data pre-processor for compression of video data;
       a compression encoder to convert video data into compressed format; and
       a meter for degradations and distortions (video quality analyzer) to process video data and data generated by the transcoder; and
       a report generator coupled to the degradations and distortions meter to provide a quality control report, wherein the report generator determines a unified quality impairment (qi) degradation scale.

15. A method for video transcoding, comprising:
    selecting video content package from one of: External Test Pattern Generator, Built-in Test Pattern Generator, Video Content Stream, and Embedded Video Test Stream, wherein the video content package contains video content data and a package metadata with descriptive metadata and embedded quality control (QC) Report; and performing closed-loop optimization of the transcoding process with
- (a) an outer loop, including a media asset management (MAM) system; and
- (b) an inner loop closed by the link of a metadata processor with built-in settings control; and generating quality impairment information in real time by analyzing both test patterns and live video content, wherein partial quality impairment values are combined with data available from an Embedded QC Report a n d provided to a Settings Controller; a Top Layer Settings Controller; an Embedded QC Report contained in an output package; and an External QC Report transmitted or broadcasted over a network and wherein the settings controller analyzes Modified Transcoding Presets from the MAM system (outer loop) and Current Quality Impairment data (inner loop).

16. The method of claim 15, comprising processing test streams simultaneously with main video content, where parallel threads are controlled by the same settings where impairments of the video stream is assessed by objective measurement of corresponding impairments of test streams.

17. The method of claim 15, comprising providing a third feedback loop.

* * * * *